United States Patent
Su et al.

(10) Patent No.: US 8,495,532 B2
(45) Date of Patent: Jul. 23, 2013

(54) SYSTEMS AND METHODS FOR CREATING FREQUENCY-DEPENDENT RC EXTRACTION NETLIST

(75) Inventors: Ke-Ying Su, Taipei (TW); Ching-Shun Yang, Zhudong (TW); Jui-Feng Kuan, Zhubei (TW); Hsiao-Shu Chao, Baoshan (TW); Yi-Kan Cheng, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 217 days.

(21) Appl. No.: 13/076,649

(22) Filed: Mar. 31, 2011

(65) Prior Publication Data

US 2012/0254811 A1   Oct. 4, 2012

(51) Int. Cl.
*G06F 17/50* (2006.01)

(52) U.S. Cl.
USPC ........... 716/101; 716/106; 716/108; 716/113; 716/136

(58) Field of Classification Search
USPC ................. 716/100, 101, 106, 108, 110, 113, 716/136
See application file for complete search history.

(56) References Cited

U.S. PATENT DOCUMENTS

| | | | | |
|---|---|---|---|---|
| 5,446,676 A * | 8/1995 | Huang et al. | ..................... | 703/19 |
| 5,553,008 A * | 9/1996 | Huang et al. | ..................... | 703/14 |
| 6,128,768 A * | 10/2000 | Ho | ................ | 716/115 |
| 6,311,315 B1 * | 10/2001 | Tamaki | ........................ | 716/124 |
| 6,438,729 B1 * | 8/2002 | Ho | ................. | 716/113 |
| 6,971,160 B1 * | 12/2005 | Welch et al. | ..................... | 29/832 |
| 7,669,152 B1 * | 2/2010 | Tcherniaev et al. | .......... | 716/136 |
| 7,818,698 B2 * | 10/2010 | Su et al. | ........................ | 716/136 |
| 8,156,456 B1 * | 4/2012 | Rahman et al. | ............... | 716/104 |
| 8,214,784 B2 * | 7/2012 | Su et al. | ........................ | 716/110 |
| 2009/0077507 A1 | 3/2009 | Hou et al. | | |

* cited by examiner

*Primary Examiner* — Sun Lin
(74) *Attorney, Agent, or Firm* — Duane Morris LLP

(57) ABSTRACT

A method includes approximating a physical characteristic of a semiconductor substrate with a frequency-dependent circuit, and creating a technology file for the semiconductor substrate based on the frequency-dependent circuit. The physical characteristic of the semiconductor substrate identified by one of an electromagnetic simulation or a silicon measurement. The technology file is adapted for use by an electronic design automation tool to create a netlist for the semiconductor substrate and is stored in a non-transient computer readable storage medium.

20 Claims, 16 Drawing Sheets

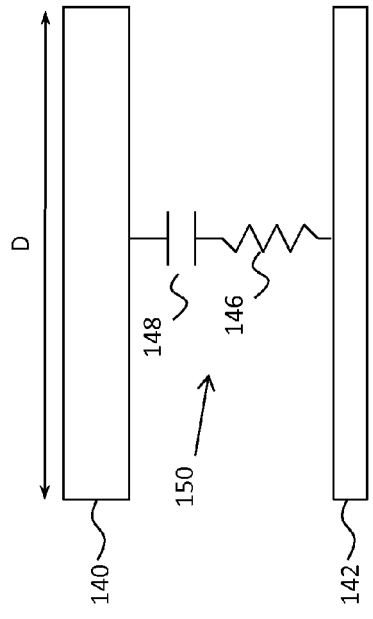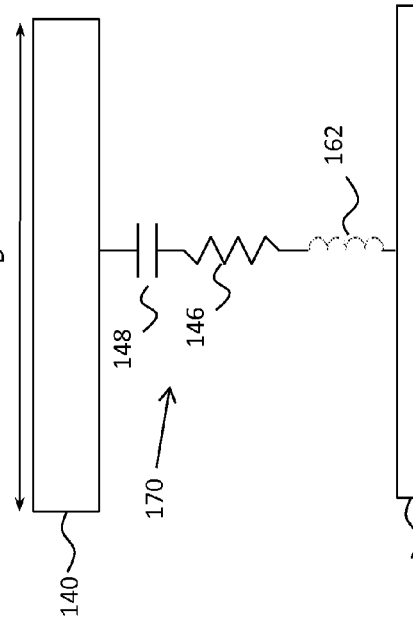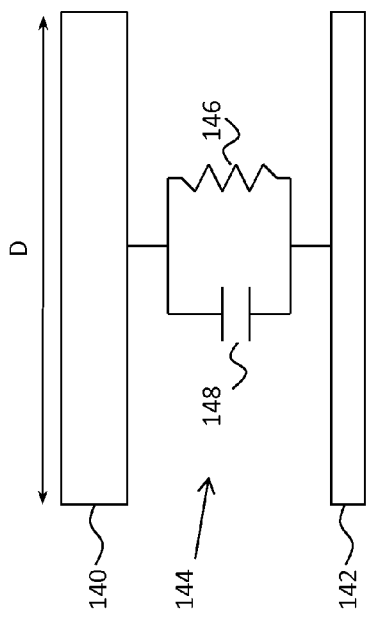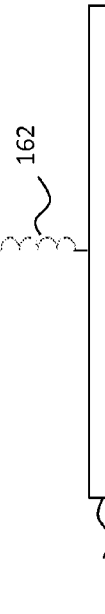
FIG. 7A (RELATED ART)
FIG. 7B (RELATED ART)
FIG. 7C (RELATED ART)
FIG. 7D (RELATED ART)

FIG. 9A

| METAL COMBINATIONS: WIDTH ($\mu m$) | | | | C (fF/$\mu m$) & R ($\Omega/\mu m$) @ $f_0$ GHz | SENSITIVITIES $f \leq f_0$ | | | SENSITIVITIES $f > f_0$ | | | C (fF/$\mu m$) & R ($\Omega/\mu m$) @ $f_0$ GHz | SENSITIVITIES $f \leq f_0$ | | | SENSITIVITIES $f > f_0$ | | |
|---|---|---|---|---|---|---|---|---|---|---|---|---|---|---|---|---|---|
| MB | M1 | M2 | MB-M1 | | $S_1$ | $S_2$ | ... | $S'_1$ | $S'_2$ | ... | MB-M2 | $S_1$ | $S_2$ | ... | $S'_1$ | $S'_2$ | ... |
| | | | | $f_0$ | $S_{c1,1}$ $S_{r1,1}$ | $S_{c2,1}$ $S_{r2,1}$ | ... | $S'_{c1,1}$ $S'_{r1,1}$ | $S'_{c2,1}$ $S'_{r2,1}$ | ... | | $S_{c1,2}$ $S_{r1,2}$ | $S_{c2,2}$ $S_{r2,2}$ | ... | $S'_{c1,2}$ $S'_{r1,2}$ | $S'_{c2,2}$ $S'_{r2,2}$ | ... |
| | | | | $C_{1,1}$ $R_{1,1}$ | | | | | | | $C_{1,2}$ $R_{1,2}$ | | | | | | |
| $W_{b1}$ | $W_{11}$ | $W_{21}$ | $W_{11}$ | | | | | | | | $W_{c1}$ | | | | | | |
| | ... | ... | ... | | | | | | | | ... | | | | | | |
| | $W_{1n}$ | $W_{2m}$ | $W_{1n}$ | | | | | | | | $W_{cm}$ | | | | | | |
| $W_{b2}$ | $W_{11}$ | $W_{11}$ | $W_{11}$ | | | | | | | | $W_{c1}$ | | | | | | |
| | ... | ... | ... | | | | | | | | ... | | | | | | |
| | $W_{1n}$ | $W_{1m}$ | $W_{1n}$ | | | | | | | | $W_{cm}$ | | | | | | |
| ... | $W_{11}$ | $W_{11}$ | $W_{11}$ | | | | | | | | $W_{c1}$ | | | | | | |
| | ... | ... | ... | | | | | | | | ... | | | | | | |
| $W_{bk}$ | $W_{1n}$ | $W_{1m}$ | $W_{1n}$ | | | | | | | | $W_{cm}$ | | | | | | |
| ... | ... | ... | ... | | | | | | | | ... | | | | | | |

LINE LENGTH $D_1 \leq D < D_2$

LINE LENGTH $D_2 \leq D < D_3$

LINE LENGTH $D_n \leq D < D_m$

900

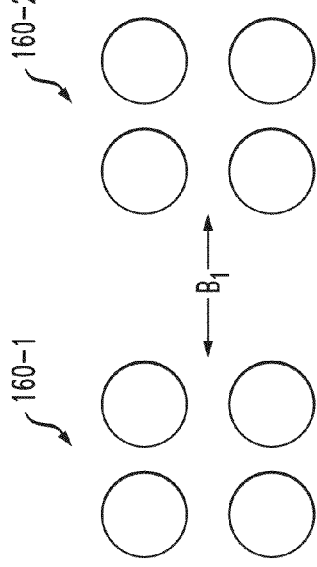
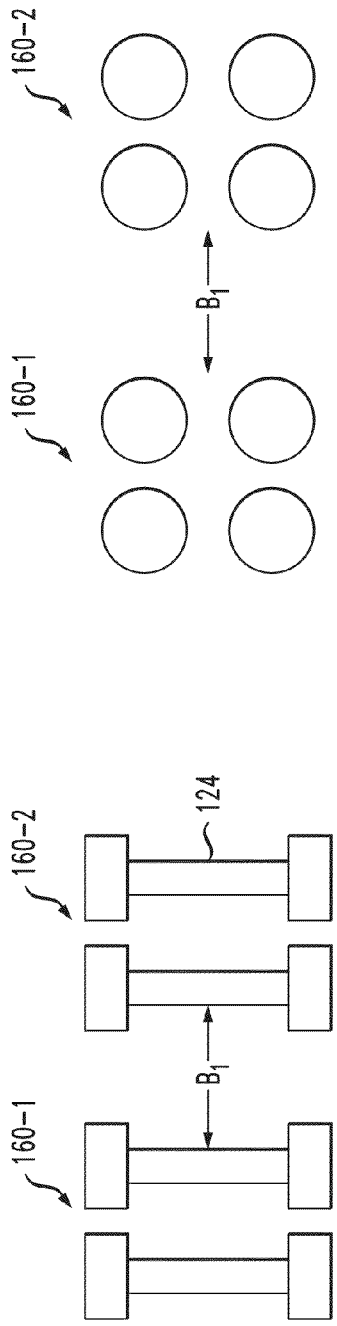
FIG. 10A
FIG. 10B
FIG. 10C

US 8,495,532 B2

SYSTEMS AND METHODS FOR CREATING FREQUENCY-DEPENDENT RC EXTRACTION NETLIST

FIELD

The disclosed system and method relate to integrated circuits. More particularly, the disclosed system and method relate to modeling and fabricating integrated circuits that connected by an interposer.

BACKGROUND

Integrated circuits ("ICs") are incorporated into many electronic devices. IC packaging has evolved such that multiple ICs may be vertically joined together in so-called three-dimensional ("3D") packages in order to save horizontal area on a printed circuit board ("PCB"). These 3D IC packages may use an interposer, which may be formed from a semiconductor material such as silicon, for coupling one or more dies to a PCB. Interposers affect the operating characteristics of the ICs that are bonded or otherwise coupled to the interposer due to the resistance and capacitance ("RC") of the semiconductor substrate.

BRIEF DESCRIPTION OF THE FIGURES

FIGS. 7A-7D illustrate various frequency-dependent circuits that may be substituted into the pi-circuit model illustrated in FIGS. 6A and 6B.

FIG. 9A is one example of a technology file for a semiconductor substrate including one or more spaced apart and unconnected conductors.

FIG. 10A is one example of a technology file for describing the physical characteristics of a semiconductor substrate including one or more through-silicon vias.

FIG. 10B is one example of a cross-sectional view of two spaced apart and unconnected arrays of through-silicon vias.

FIG. 10C is a top side view of the arrays of through-silicon vias illustrated in FIG. 10B.

DETAILED DESCRIPTION

The disclosed system and method advantageously create technology ("tech") files and netlists that account for electrical coupling between front-side and back-side conductors of a floating semiconductor substrate. The tech files and nelists may advantageously be created such that they may be implemented in an existing EDA tools without requiring new simulation engines to be designed. Additionally, the methodology described herein may be applied to develop tech files and netlists that account for thermal stress, power, or other changes in complex physical behaviors.

Figure 1:
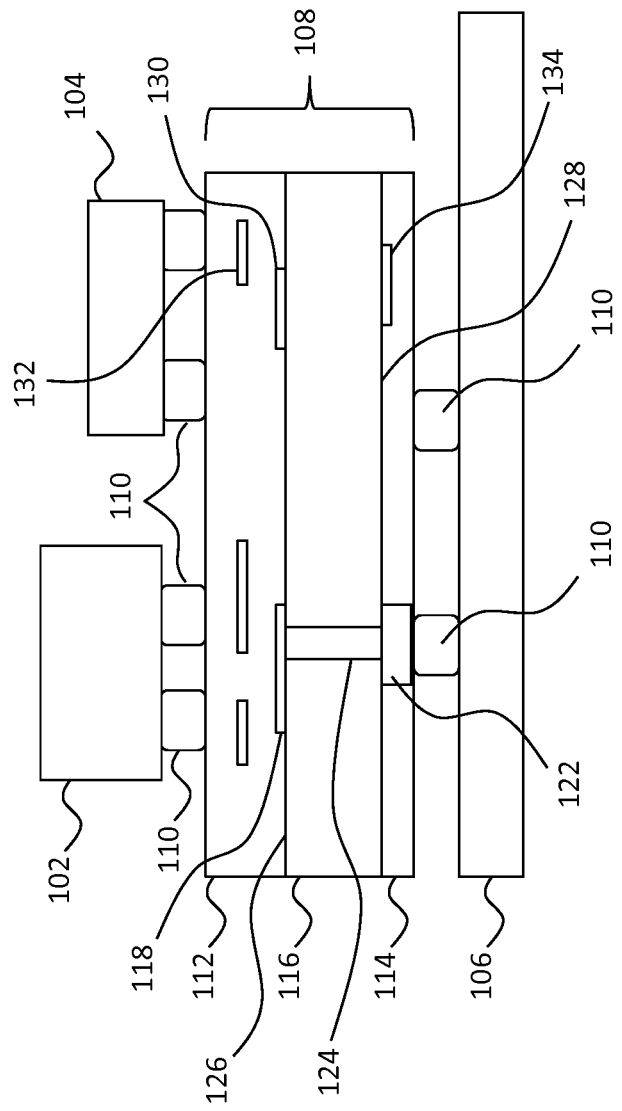
FIG. 1 is a cross-sectional view of one example of an interposer disposed between integrated circuits and a printed circuit board.

For example, FIG. 1 illustrates one example of a three-dimensional ("3D") integrated circuit ("IC") package 100 in which first and second IC chips 102, 104 are coupled to a printed circuit board ("PCB") 106 using an interposer 108. As will be understood by one skilled in the art, IC chips 102, 104 may be bonded to interposer 108 using conductive bumps 110, which may be referred to as a "ubump". Conductive bumps 110 may also be used to couple interposer 110 to PCB 106. As will be understood by one skilled in the art, ubumps 110 connecting the IC chips 102, 104 to interposer 108 may have different sizes and electrical properties than the ubumps 110 connecting the interposer 110 to PCB 106.

Interposer 108 includes front-side and back-side interconnect layers 112, 114 with a semiconductor substrate 116 sandwiched therebetween. In some applications, substrate 116 is not grounded and thus is electrically floating. Front- and back-side interconnect layers 112, 114 each may include a plurality of metal layers (e.g., M1, M2, etc.) and dielectric layers. As shown in FIG. 1, front-side interconnect structure 112 may include conductors 118, 130 disposed in a first metal layer (i.e., M1) and a conductor 132 disposed in a second metal layer (i.e., M2). Conductor 118 in front-side interconnect layer 112 may be electrically connected to metal conductor 122 in back-side interconnect layer 114 by way of a through-silicon via ("TSV") 124 that extends from front-side surface 126 of semiconductor substrate 116 to rear-side surface 128 of semiconductor substrate 116.

Front- and back-side interconnect layers 112, 114 may also include conductors 130, 132, 134 that are not connected to each other. Although front and rear conductors 130, 132, 134 are not conductively connected to each other, electrical coupling (i.e., capacitive and/or inductive coupling) between conductors 130, 132, and 134 occurs during operation of 3D IC 100. Electrical coupling also can occur between conductors in the same side of semiconductor substrate 116. For example, electrical coupling may occur between conductor 118 and 130 if there is no conductive connection between them. Coupling may also occur between adjacent TSVs 124 that extend through semiconductor substrate 116. The electrical coupling between conductors in the interposer degrades the performance of the 3D IC as conventional simulation software does not analyze the effects of such coupling.

Figure 2:
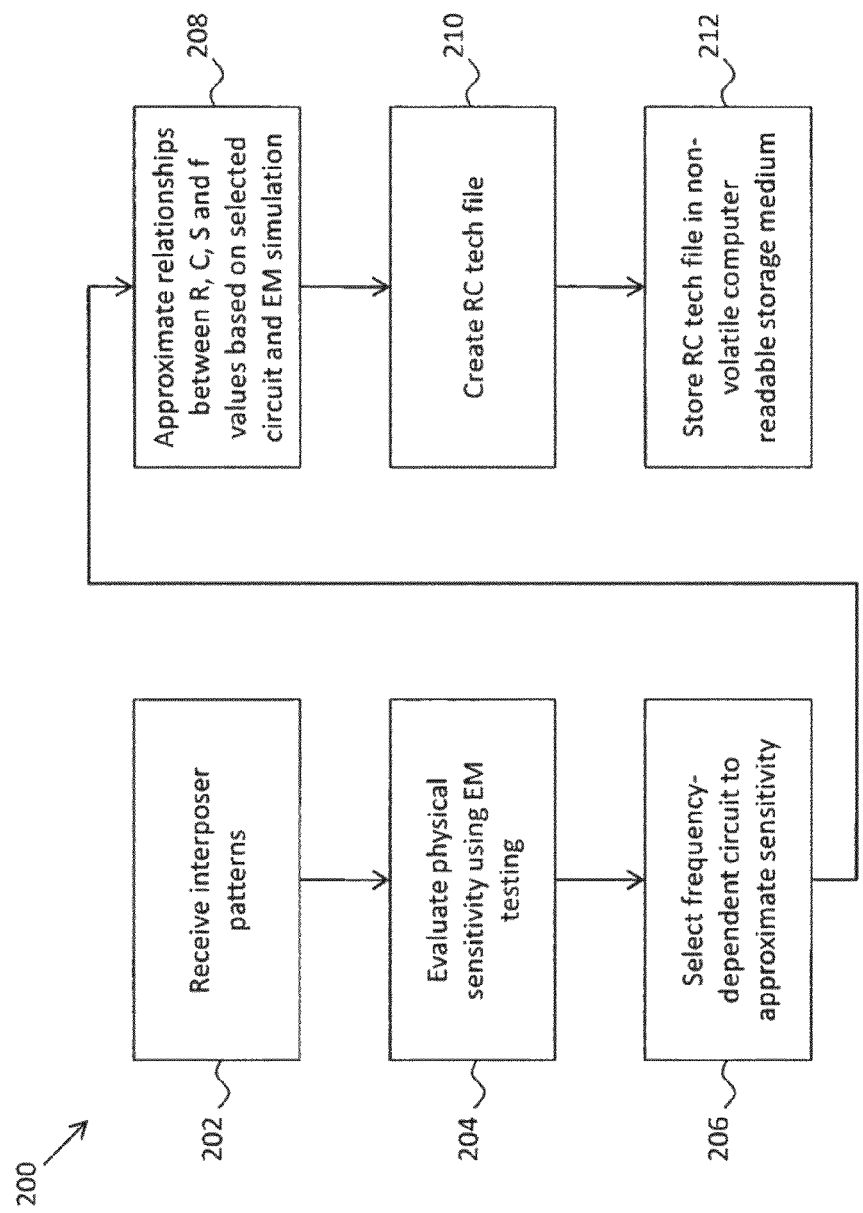
FIG. 2 is one example of a flow chart for generating an improved technology data file.
Figure 3:
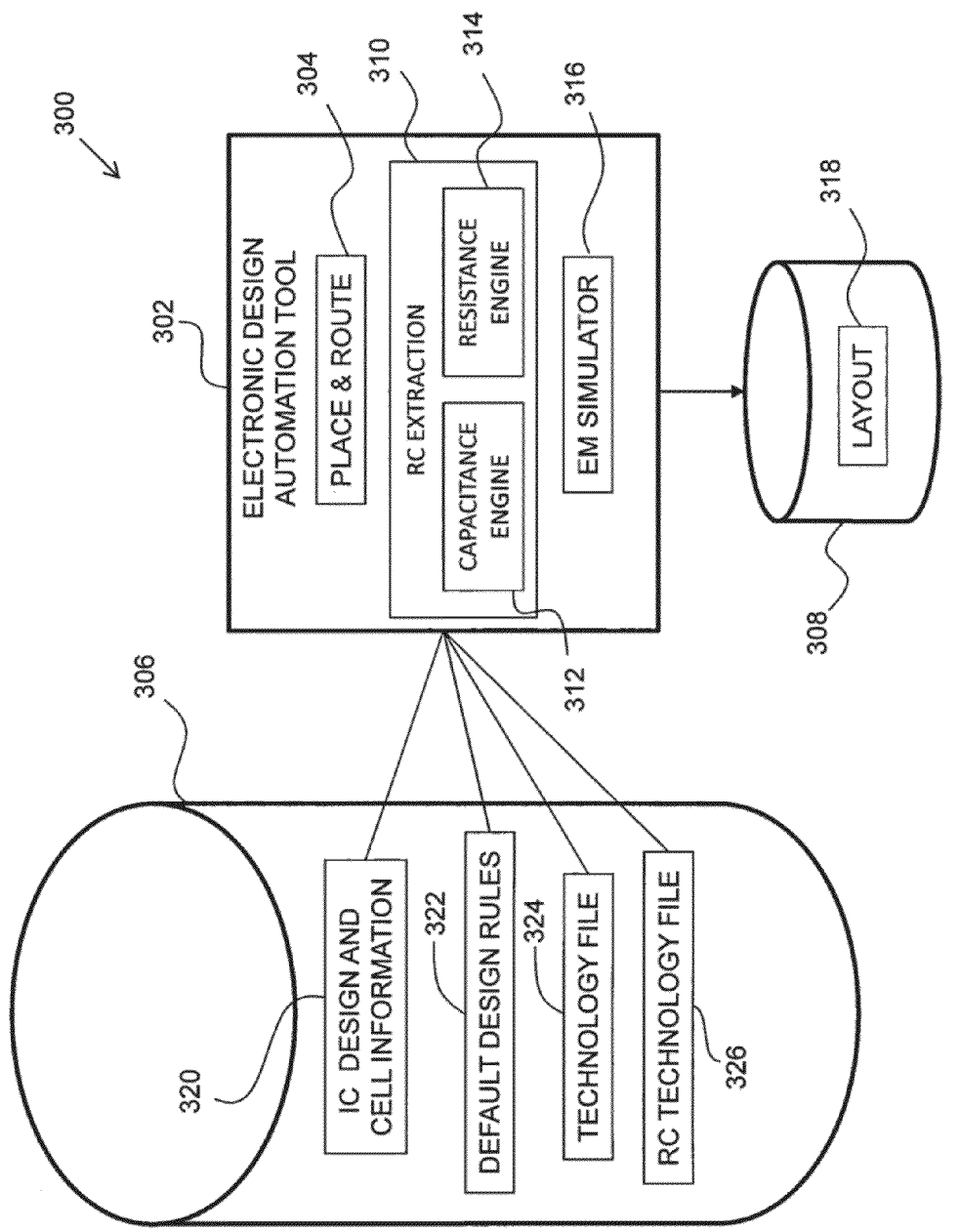
FIG. 3 is a block diagram of one example of a system including an electronic design automation tool.

FIG. 2 is a flow diagram of one example of an improved method 200 for generating an RC tech file that includes physical characteristics that approximate the coupling experienced by a floating semiconductor interposer 108. As will be understood by one skilled in the art, the RC tech file includes process-specific parameters such as layer thicknesses, resistance, capacitance, and s-parameters of various layers. Tech files are used by simulation tools for simulating the response of the proposed IC design under various operating conditions as described in U.S. Patent Application Publication No. US2009/0077507 in the name of Hou et al., entitled "Method of Generating Technology file for Integrated Circuit Design Tools", the entirety of which is incorporated by reference herein. The flow diagram of FIG. 2 may be performed using a system, such as system 300 illustrated in FIG. 3. System 300 includes an electronic design automation ("EDA") tool 302 such as "IC COMPILER"™, sold by Synopsis, Inc. of Mountain View, Calif., which may include a place and route tool 304, such as "ZROUTE"™, also sold by Synopsis. Other EDA tools 302 may be used, such as the "VIRTUOSO" custom design platform or the Cadence "ENCOUNTER"® digital IC design platform may be used, along with the "VIRTUOSO" chip assembly router 304, all sold by Cadence Design Systems, Inc. of San Jose, Calif.

EDA tool 302 is a special purpose computer formed by retrieving stored program instructions from a non-transient computer readable storage medium 306, 308 and executing the instructions on a general purpose processor (not shown). Examples of non-transient computer readable storage mediums 306, 308 include, but are not limited to, read only memories ("ROMs"), random access memories ("RAMs"), flash memories, or the like. Tangible, non-transient machine readable storage mediums 306, 308 are configured to store data generated by the place and route tool 304.

EDA tool 302 also includes an RC extraction tool 310, having a capacitance engine 312 and a resistance engine 314, as well as an electromagnetic ("EM") simulation tool 316. RC extraction tool 310 is configured to perform RC timing analysis of the circuit patterns of interposer 108 such that the RC timing analysis is performed based on the layout.

Router 304 is capable of receiving an identification of a plurality of cells to be included in an integrated circuit ("IC") or interposer layout 318, including a list 320 of pairs of cells within the plurality of cells to be connected to each other. Router 304 may be equipped with a set of default design rules 322 and tech file 324. In addition, an RC tech file 326 developed by process 200 (shown in FIG. 2) provides parameters for a floating interposer 108. As described below, these physical parameters are based on a frequency-dependent circuit model that approximates the semiconductor's response to an electromagnetic wave.

Referring again to FIG. 2, an interposer pattern or layout 318 is received and/or created at EDA tool 302 at block 202. As will be understood by one skilled in the art, the interposer patterns may include the length, width, and thickness of the interposer 108 as well as the lengths, widths, and thicknesses of the conductors in the front- and back-sides 112, 114 of interposer 108.

Figure 5A:
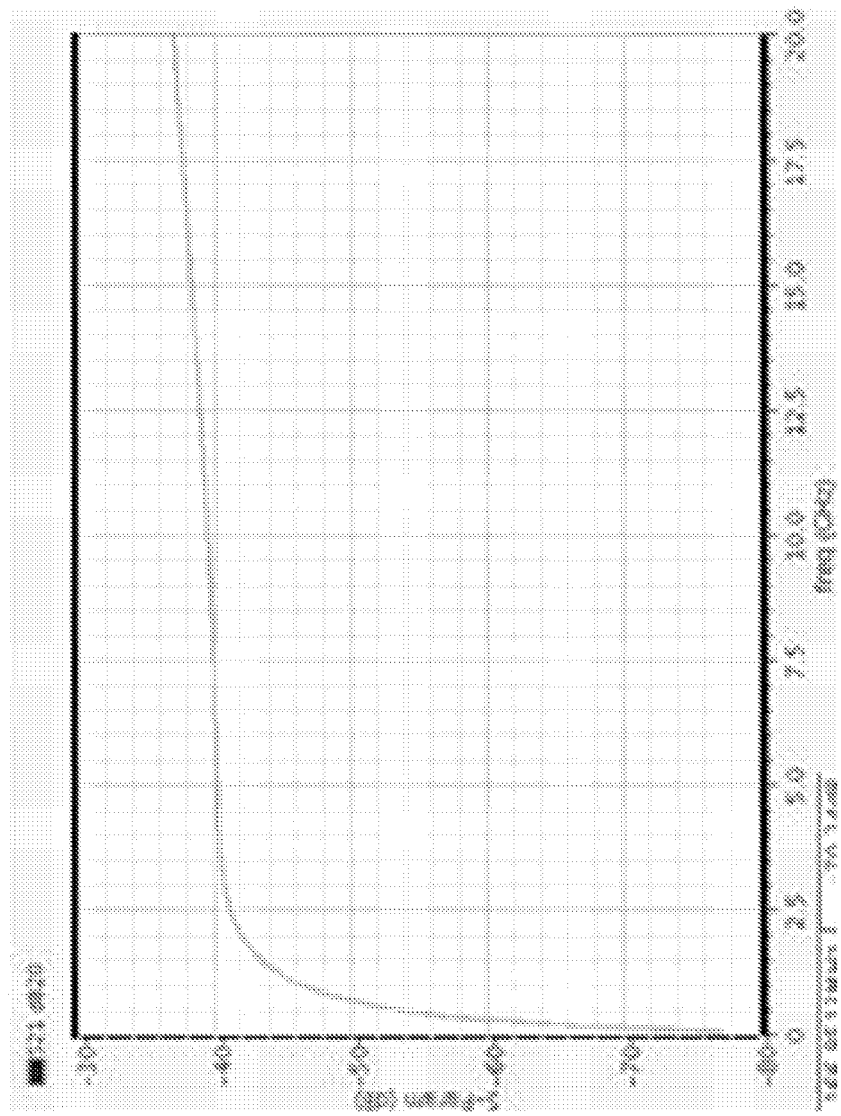
FIG. 5A is one example of an s-parameter versus frequency graph.
Figure 5B:
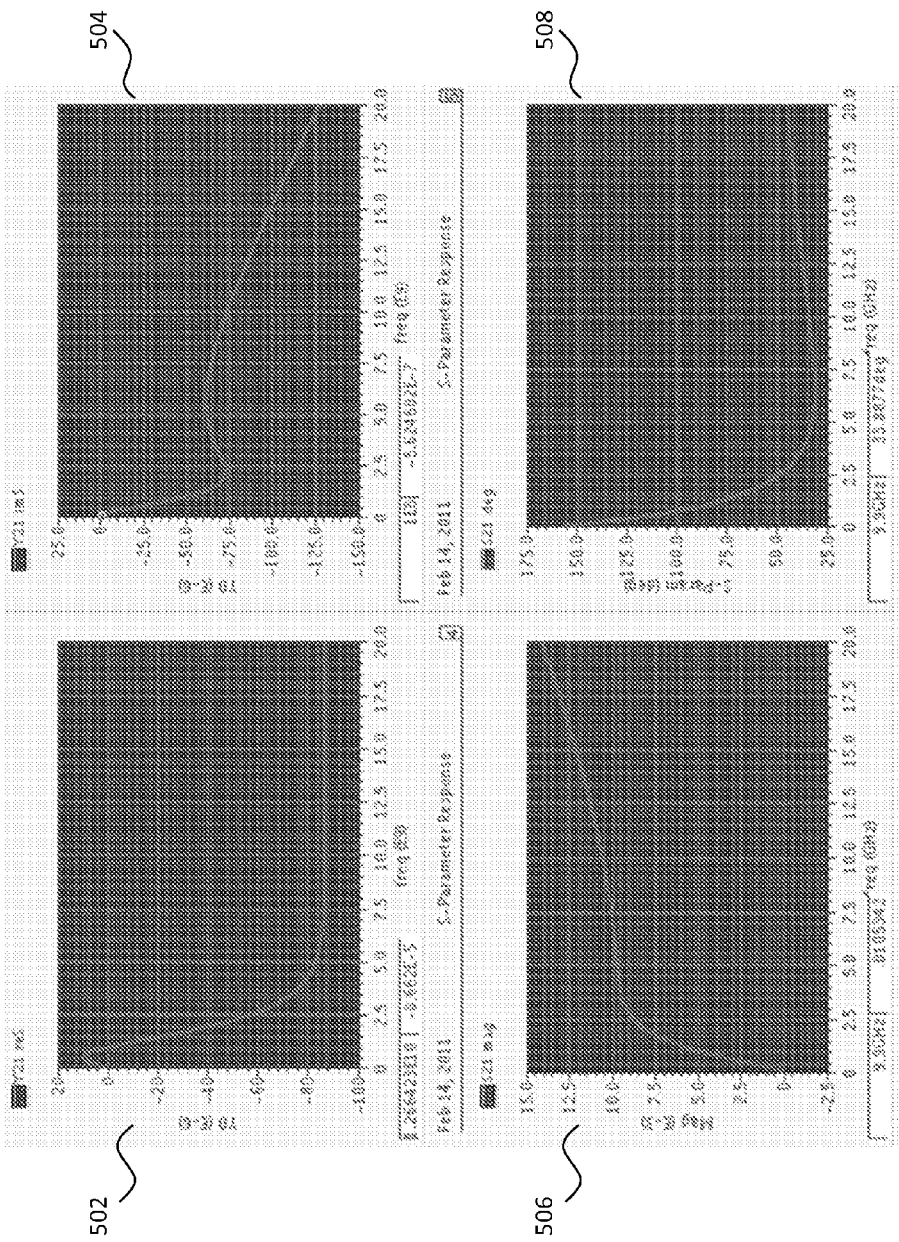
FIG. 5B are graphs of the real and imaginary components of s- and y-parameters versus frequency.

The interposer 108 is analyzed by EM simulation tool 316 and/or by analyzing silicon data at block 204. EM simulation tool 316 provides a full-wave analysis of the physical characteristics of the interposer 108 including the floating semiconductor substrate 108. The results of the EM simulation may provide a user of EDA tool 302 with a graphical representation of the real and imaginary components of the s- and y-parameters as will be understood by one skilled in the art and as shown in FIGS. 5A and 5B. Such graphical representation may be displayed on a display (not shown in FIG. 3) as will be understood by one skilled in the art.

Equations 1 and 2 below relate the curl of the electric field strength, E, and the magnetic field strength, H, to dielectric permittivity, magnetic permeability, and conductivity.

$$\nabla \times \overline{E} = -j\omega\mu\overline{H} \qquad \text{Eq. 1}$$

$$\nabla \times \overline{H} = j\omega\epsilon\overline{E} + \sigma\overline{E} \qquad \text{Eq. 2}$$

Where,
∈ is the dielectric permittivity;
μ is the magnetic permeability; and
σ is the conductivity.

The physical characteristics of the interposer (e.g., dielectric permittivity, magnetic permeability, and conductivity) are related to current density, J, as set forth in Equations 3 and 4 below.

$$J = \sigma E \qquad \text{Eq. 3}$$

$$\nabla \cdot J = -\frac{\partial p}{\partial t} \qquad \text{Eq. 4}$$

Where,
ρ is charge; and
t is time.

Figure 4A:
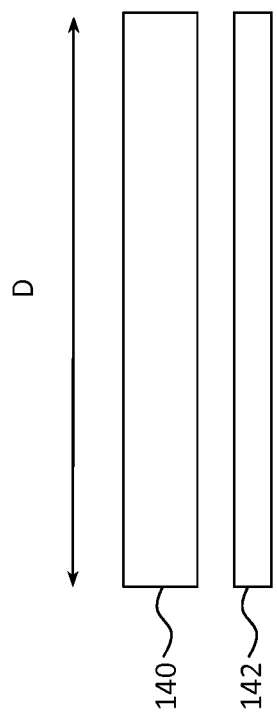
FIG. 4A is a cross sectional view of one example of two conductors separate by a semiconductor substrate.
Figure 4B:
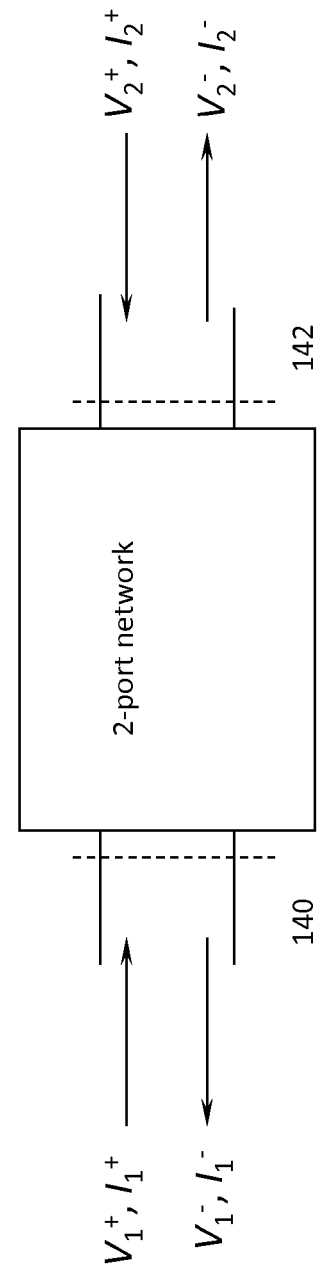
FIG. 4B is a schematic diagram of the two port network illustrated in FIG. 4.

FIG. 4A is a cross-sectional view of one example of a two (2) conductors (ports) 140, 142 in an interposer, and FIG. 4B illustrates the EM simulation or silicon measurement of the two (2) ports in accordance with FIG. 4A. In some embodiments, port 140 is a conductor disposed in the back-end interconnect layer 114 and port 142 is a conductor in the front-end interconnect layer 112; however, one skilled in the art will understand that the ports may be in the same or different metal layer in the front- or back-side interconnect structure 112, 114. The EM simulation of the two ports 140, 142 provides the "scattering parameter" or "s-parameter", and the admittance parameter, sometimes referred to herein as "y-parameter"), of the interposer or other tested device. The relationship between the s-parameter and voltage is set forth below in Equation 5.

$$S_{ij} = \frac{V_i^-}{V_j^+} \bigg| V_k^+ = 0 \text{ for } k \neq j \qquad \text{Eq. 5}$$

As mentioned above, EM simulation tool 316 generates curves of the s- and y-parameters as a function of frequency as illustrated in FIGS. 5A and 5B. FIG. 5B illustrates the s- and y-parameters as a function of frequency provided by the EM simulation system. Specifically, graph 502 illustrates the real portion of the y-parameter, graph 504 illustrates the imaginary portion of the y-parameter, graph 506 illustrates the magnitude of the s-parameter, and graph 508 illustrates the phase of the s-parameter.

Figure 6A:
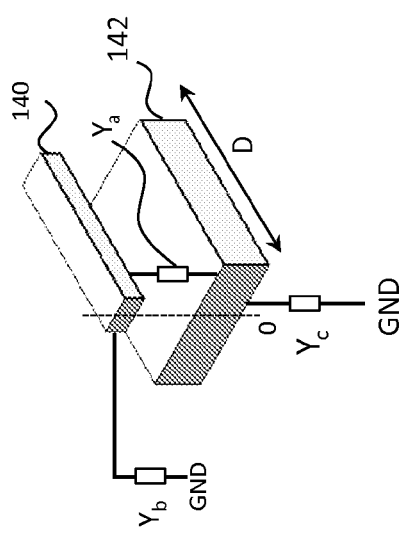
FIG. 6A is an isometric view of pi-circuit model for a pair of conductors separated by a semiconductor.
Figure 6B:
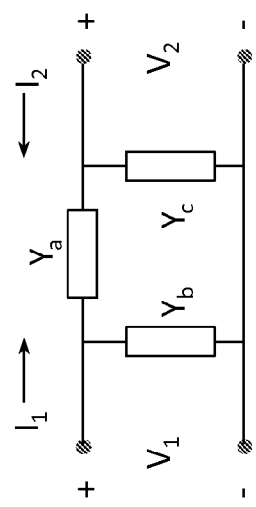
FIG. 6B is a schematic view of a pi-circuit model in accordance with FIG. 6A.

At block 206, a frequency-dependent circuit is selected that best approximates the s-parameter between the conductors 140, 142. As will be understood by one skilled in the art, the frequency dependency circuit is selected for creating a pi-circuit model of the semiconductor. For example, FIG. 6A illustrates three components of the y-parameter, Ya, Yb, and Yc, as they relate to conductors 140 and 142 in the semiconductor substrate, and FIG. 6B illustrates the corresponding circuit diagram of FIG. 6A. The matrix set forth below in Equation 6 is used to solve for the components Ya, Yb, and Yc shown in FIGS. 6A and 6B.

$$\begin{bmatrix} I_1 \\ I_2 \end{bmatrix} = \begin{bmatrix} Y_{11} & Y_{12} \\ Y_{21} & Y_{22} \end{bmatrix} \begin{bmatrix} V_1 \\ V_2 \end{bmatrix} \rightarrow \begin{cases} Y_a = -Y_{12} \\ Y_b = Y_{11} + Y_{12} \\ Y_c = Y_{22} + Y_{21} \end{cases} \quad \text{Eq. 6}$$

Components Yb and Yc are adequately modeled and simulated by the capacitance and resistance engines 312, 314 of the EDA tool 302 that are configured to model pure conductive and pure dielectric components. Consequently, the frequency-dependent circuit may only be selected for y-component Ya, which corresponds to the semiconductor substrate 116 between conductors 140 and 142. Various frequency dependent circuits may be selected for approximating the physical response of the semiconductor substrate based on the EM simulation data.

For example, FIG. 7A illustrates a frequency-dependent resistor-capacitor ("RC") circuit 144 including a resistor 148 disposed in parallel with a capacitor 148 between conductors 140 and 142, and FIG. 7B illustrates a frequency-dependent RC circuit 150 comprising a resistor 146 disposed in series with capacitor 148 between conductors 140 and 142. FIG. 7C illustrates a an RCL circuit 160 including a resistor 146 disposed in parallel with a capacitor 148 and an inductor 162, which are all disposed between conductors 140 and 142. FIG. 7D illustrates an RCL circuit 170 in which resistor 146, capacitor 148, and inductor 162 are coupled in series between conductors 140 and 142. One skilled in the art will understand that other frequency-dependent circuits may be used to approximate the EM simulation results; however, more complex circuits result in more complex computations.

At block 208, the frequency-dependent circuit selected at block 206 is used to develop relationships between the resistance, capacitance, frequency, and the s- and y-parameters. For example, if the selected frequency-dependent circuit is the RC circuit 144 illustrated in FIG. 7A, then the following equation may be used for Ya.

$$Y_a = \frac{1}{R_D} + j\omega C_D \quad \text{Eq. 7}$$

Where, $$R = \frac{R_D}{D};$$

$$C = \frac{C_D}{D};$$

and

D is the length of conductors 140 and 142.

If the selected frequency-dependent circuit is the RC circuit 150 illustrated in FIG. 7B, then the following equation may be used for Ya.

$$\frac{1}{Y_a} = R_D + \frac{1}{(j\omega C_D)} \quad \text{Eq. 8}$$

Equation 9 may be used for Ya if the frequency-dependent circuit is the RCL circuit 160 illustrated in FIG. 7C $$Y_a = \frac{1}{R_D} + \frac{1}{j\omega L_D} + j\omega C_D \quad \text{Eq. 9}$$

-continued

Where, $$R = \frac{R_D}{D};$$

$$C = \frac{C_D}{D}; \text{ and}$$

$$L = \frac{L_D}{D}$$

If the RCL circuit 170 is used for the frequency-dependent circuit, then Equation 10 is used to compute Ya as follows.

$$\frac{1}{Y_a} = R_D + j\omega L_D + \frac{1}{j\omega C_D} \quad \text{Eq. 10}$$

Where, $$R = \frac{R_D}{D};$$

$$C = \frac{C_D}{D}; \text{ and}$$

$$L = \frac{L_D}{D}$$

If the frequency-dependent circuit is RC circuit 144 illustrated in FIG. 6A, then a relationship is determined for the capacitance and resistance of the substrate with respect to frequency. For example, FIGS. 8A and 8B respectively illustrate graphs of capacitance versus frequency and resistance versus frequency that may be generated during the EM simulation. A capacitance value $C_0$ for a specified frequency value, $f_{C0}$, is selected at a point along line 802 in FIG. 8A. The selected value of $C_0$ and $f_{C0}$ may be checked for accuracy using a piecewise linear, piecewise quadratic approach, or another approach using higher order mathematical approximations.

For example, in the piecewise linear approach approximations are made for the slope of curves 802 and 806, which are disposed on opposite sides of the selected value for $C_0$. The capacitance, C, is then defined by two equations with n=1:

$$C = C_0 + \sum_{i=1}^{n} S_{ci1}(f - f_{C0})^i, \text{ for } f \leq f_{C01} \quad \text{Eq. 11a}$$

$$C = C_0 + \sum_{i=1}^{n} S_{ci2}(f - f_{C0})^i, \text{ for } f > f_{C01} \quad \text{Eq. 11b}$$

As the values for $C_1$, $C_0$, $f_{C0}$, $f_{C1}$ are known from FIG. 8A, then Equations 11a may be solved for SC1 as follows:

$$S_{C1} = \frac{C_1 - C_0}{f_{C1} - f_{C0}} \quad \text{Eq. 12}$$

A similar method may be used for Equation 11b. The piecewise quadratic approach may use the following equations for $f \leq f_{01}$:

$$C_1 = C_0 + S_{C1}(f_{C1} - f_{C0})^1 + S_{C2}(f_{C1} - f_{C0})^2 \quad \text{Eq. 13a}$$

$$C_2 = C_0 + S_{C2}(f_{C2} - f_{C0})^1 + S_{C2}(f_{C2} - f_{C0})^2 \quad \text{Eq. 13b}$$

Figure 8A:
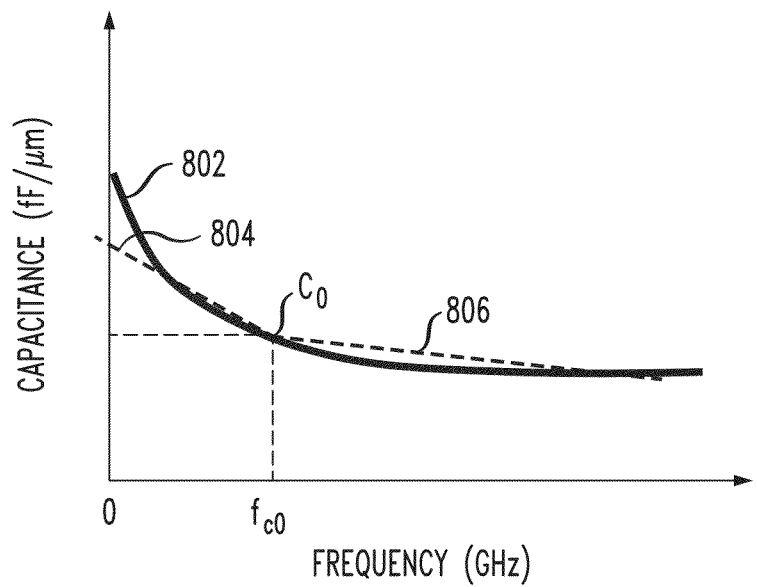
FIG. 8A is one example of a piecewise linear approximation of a curve on a capacitance versus frequency graph.

Equations 13a and 13b have two unknowns, $S_{C1}$ and $S_{C2}$ and the rest of the values may be derived from the graph in FIG. 8A or a table or equation corresponding to the graph. Accordingly, the unknowns may be solved for in a linear equation since there are two equations and two unknowns. The same procedure is used for $f>f_{C01}$ as will be understood by one skilled in the art.

Figure 8B:
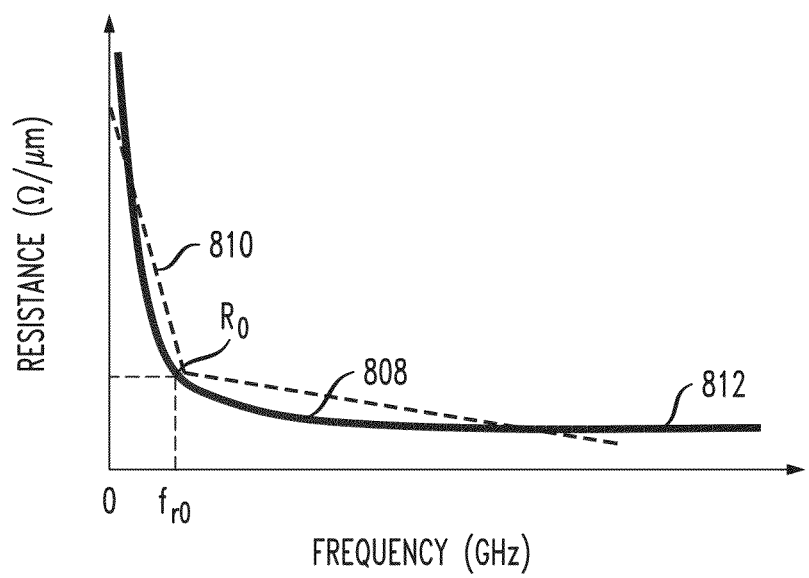
FIG. 8B is one example of a piecewise linear approximation of a curve on a resistance versus frequency graph.

Similarly, a resistance value $R_0$ for a specified frequency value $f_{R0}$ is selected at a point along line 804 of the resistance versus frequency curve of FIG. 8B such that two curves 810, 812 are defined on either side of point $R_0$. The methods that may be implemented for determining $R_0$ are similar to those described above with respect to $C_0$ and $f_0$ and redundant detailed descriptions are not provided.

One skilled in the art will understand that piecewise linear and quadratic linear approximations may be performed by system 300 in an at least partially or fully automated process in response to user input to system 300, which may be made using an input device (not shown) including, but not limited to, a mouse, a keyboard, a trackball, a touch screen, or the like. For example, a user may select an initial point for $C_0$ and $R_0$ and in response system 300 may use the underlying tables of data from which the graphical representations are generated to iteratively interpolate solutions in accordance with the piecewise linear and/or quadratic linear methods described above.

Figure 9B:
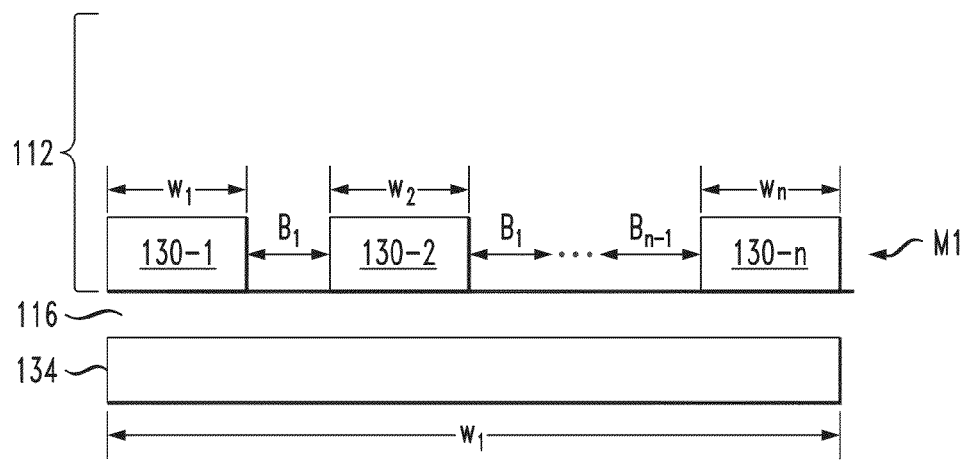
FIGS. 9B-9G illustrate various examples of conductors arranged in a semiconductor substrate that may be described by the technology file illustrated in FIG. 9A.

One or more RC tech files 326 are created at block 410 based on the approximations of block 408. The one or more RC tech files 326 may be configured in different formats for different interposer layouts 318. For example, FIG. 9A illustrates one example of a tech file format 900 for an interposer 108 including one or more conductors in the front-end interconnect structure 112 and/or back-end interconnect structure 114. FIGS. 9B-9G are examples of the cross-sections of interposers having different numbers of conductors and metal layers. More particularly, FIG. 9B illustrates one example of an interposer including one or more conductors 130-1, 130-2, . . . , 130-n disposed in a first metal layer, M1, of front-side interconnect structure 112 separated from each other by a distance, e.g., $B_1, B_2, \ldots, B_{n-1}$, and from a conductor 134 in a back-end interconnect structure. Each conductor 130 in the M1 layer of front-side interconnect structure 112 has a width, $w_{11}, w_{12}, \ldots w_{1n}$, as well as a sensitivity value to conductor 134, e.g., $S_1, S_2, \ldots S_n$, for frequencies less than or equal to the $f_0$ frequency.

Figure 9C:
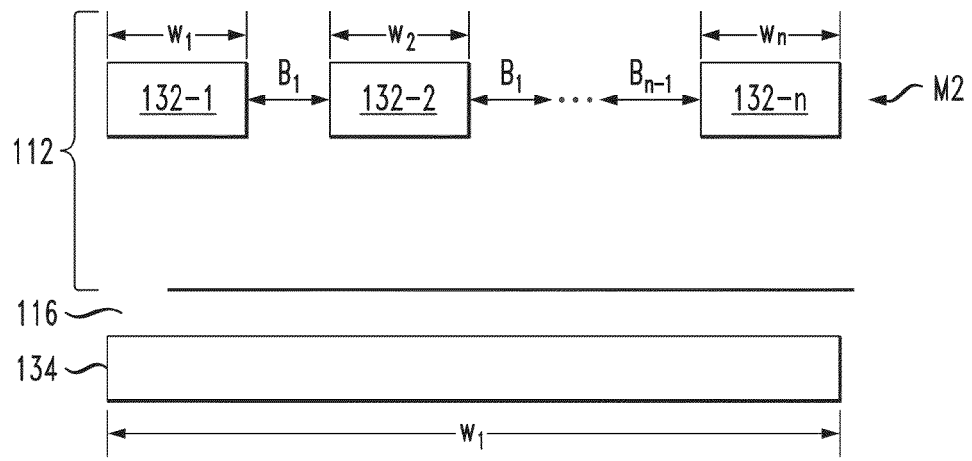
Figure 9D:
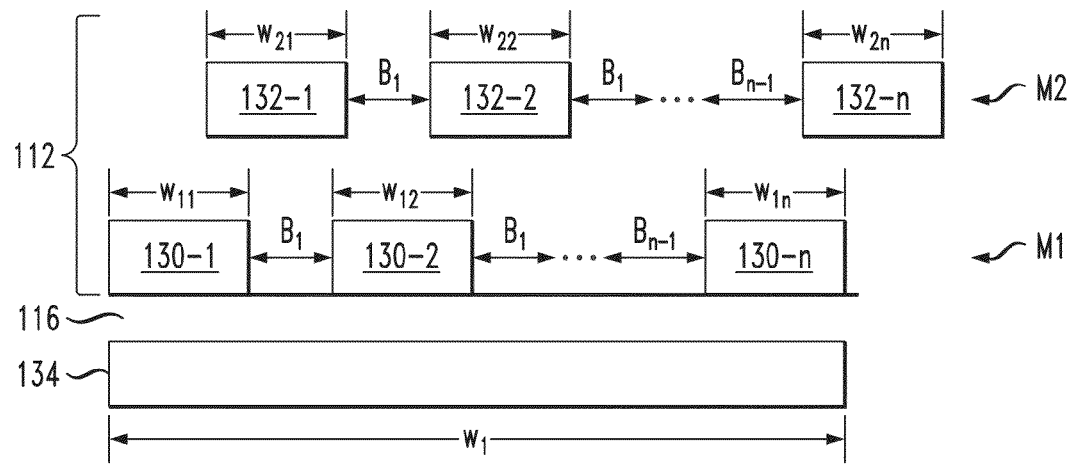
Figure 9E:
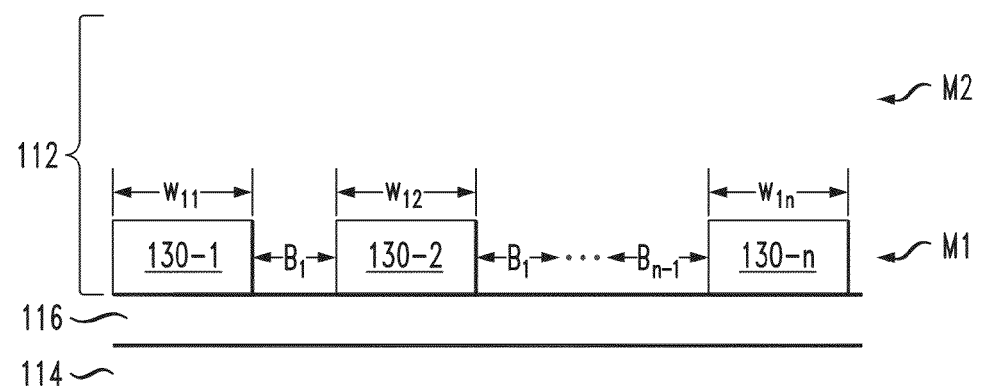
Figure 9F:
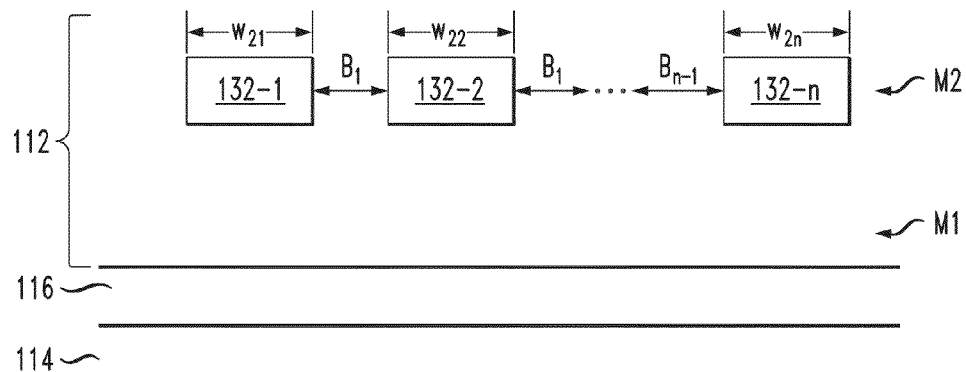
Figure 9G:
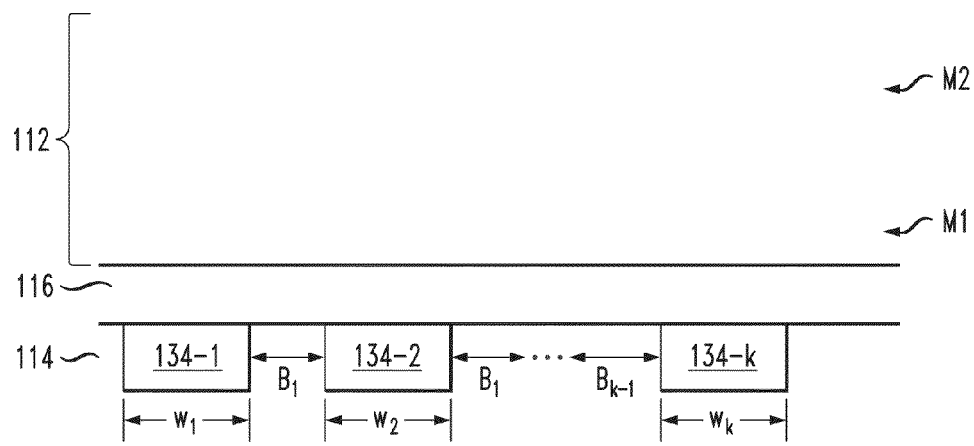

FIG. 9C illustrates one example of an interposer including a plurality of conductors 132 in a second metal layer M2 that are spaced apart from each other and from conductor 134 disposed in the back-side interconnect structure 114. An example of an interposer including a plurality of conductors 130, 132 in metal layers M1 and M2 that are spaced apart from each other and from conductor 134 in back-side interconnect structure 114 is illustrated in FIG. 9D. In the embodiments illustrated in FIGS. 9E, 9F, and 9G, a plurality of conductors are disposed in a single metal layer, which may be metal layers M1 or M2 in the front-side interconnect structure 112 or in the back-side interconnect structure 114.

Referring again to FIG. 9A, the RC tech files may include width values for k conductors in back-end interconnect structure 114 as well as for n conductors in a first metal layer, M1, and m conductors in a second metal layer, M2, of the front-end interconnect structure 112. The RC tech file may also include capacitance per length values and resistance per length values as well as frequency dependent sensitivity values based on the approximations at block 208. For example, the RC tech file may include sensitivities for coupling between conductors in the back-end interconnect structure 114 and in the first metal layer of the front-end interconnect structure 112 at frequencies less than or equal to the $f_0$ frequency, i.e., $S_1, S_2, \ldots, S_n$, and sensitivities for conductors in the second metal layer at frequencies greater than the $f_0$ frequency, i.e., $S_1, S_2, \ldots, S_m$. The RC tech file may also include sensitivities for coupling between conductors in the back-end interconnect structure 114 and in the second metal layer of the front-end interconnect structure 112 at frequencies less than or equal to the $f_0$ frequency, i.e., $S_1, S_2, \ldots S_n$, and sensitivities for conductors in the second metal layer at frequencies greater than the $f_0$ frequency, i.e., $S_1, S_2, \ldots, S_m$.

For the piecewise linear approach, the capacitance per length and resistance per length stored in the RC tech file may be calculated as follows:

$$C(w_{1min}, w_{2min}, f) = C_0 + S_{C1}f, \; f \leq f_0 \quad \text{Eq. 14}$$
$$C_0 + S_{C2}f, \; f > f_0$$
$$\ldots \quad \ldots$$
$$C(w_{1max}, w_{2max}, f) = C_0 + S'_{C1}f, \; f \leq f_0$$
$$C_0 + S'_{C2}f, \; f > f_0$$

Where,
$w_{1min}$ is a minimum width of a front-side conductor;
$w_{2min}$ is a minimum width of a back-side conductor;
$C_0$ is the capacitance between the first and second conductors at a user-specified frequency;
Sc1 is the sensitivity for frequencies less than or equal to frequency $f_0$; and
Sc2 is the sensitivity for frequencies greater than frequency $f_0$.

$$R(w_{1min}, w_{2min}, f) = R_0 + S_{R1}f, \; f \leq f_0 \quad \text{Eq. 15}$$
$$R_0 + S_{R2}f, \; f > f_0$$
$$\ldots \quad \ldots$$
$$R(w_{1max}, w_{2max}, f) = R_0 + S'_{R1}f, \; f \leq f_0$$
$$R_0 + S'_{R2}f, \; f > f_0$$

If the piecewise linear approach is used, then the columns $S_1$ and $S'_1$ in RC tech file 900 are populated and the remaining sensitivity columns, i.e., $S_2, S'_2, S_3, S'_3, \ldots S_p$, and $S'_p$, are not populated. For higher order mathematical approximations, the sensitivity columns will be further populated for each of the widths of each of the conductors in each of the metal layers. For example, if a piecewise quadratic mathematical approximation is used, then columns $S_1, S_2, S'_1$, and $S'_2$ will be populated.

FIG. 10A illustrates one example of a tech file 1000 format for an interposer 108 including one or more TSV array, such as the two (2) TSV arrays 160-1, 160-2 illustrated in FIGS. 10B and 10C. As shown in FIG. 10A, tech file 1000 may include a number of TSVs arrays 160, a number of TSVs 124 in the first TSV array, e.g., TSV array 160-1, a number TSVs 124 in a second TSV array, e.g., TSV array 160-2, capacitance per length, resistance per length, and the sensitivities for frequencies greater than or less than frequency $f_0$.

Figures 11A, 11B, 11C:
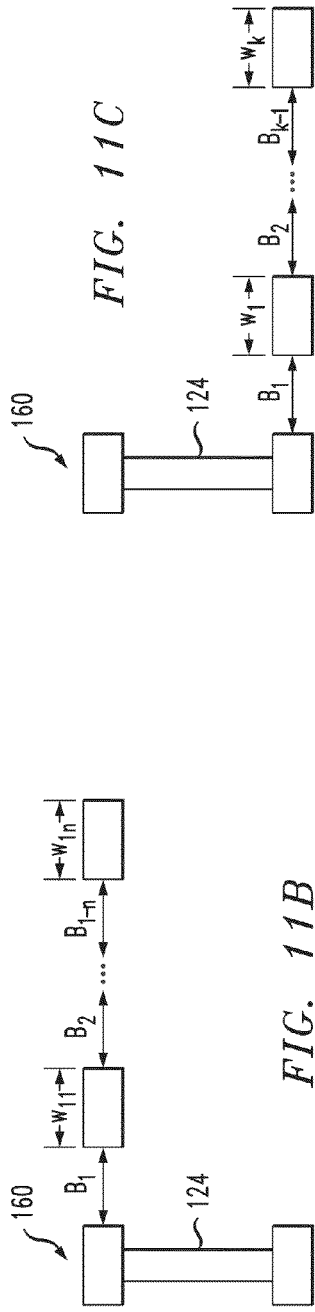
FIG. 11A is one example of a technology file for describing the physical characteristics of a semiconductor substrate that includes one or more through-silicon vias and one or more unconnected and spaced apart conductors.
FIGS. 11B and 11C illustrate various examples of through-silicon vias and conductors that may be disposed in the semiconductor substrate having physical characteristics described in the technology file illustrated in FIG. 11A.

FIG. 11A illustrates one example of a tech file 1100 for an interposer including at least one TSV 124 and at least one conductor disposed in front-side interconnect structure 112 (as illustrated in FIG. 11B) and/or back-side interconnect structure 114 (as illustrated in FIG. 11C). As shown in FIG. 11A, tech file 1100 may include a number of TSVs 124 in the TSV array 160, capacitance per length, resistance per length, and the sensitivities for frequencies greater than or less than frequency $f_0$.

Figure 12:
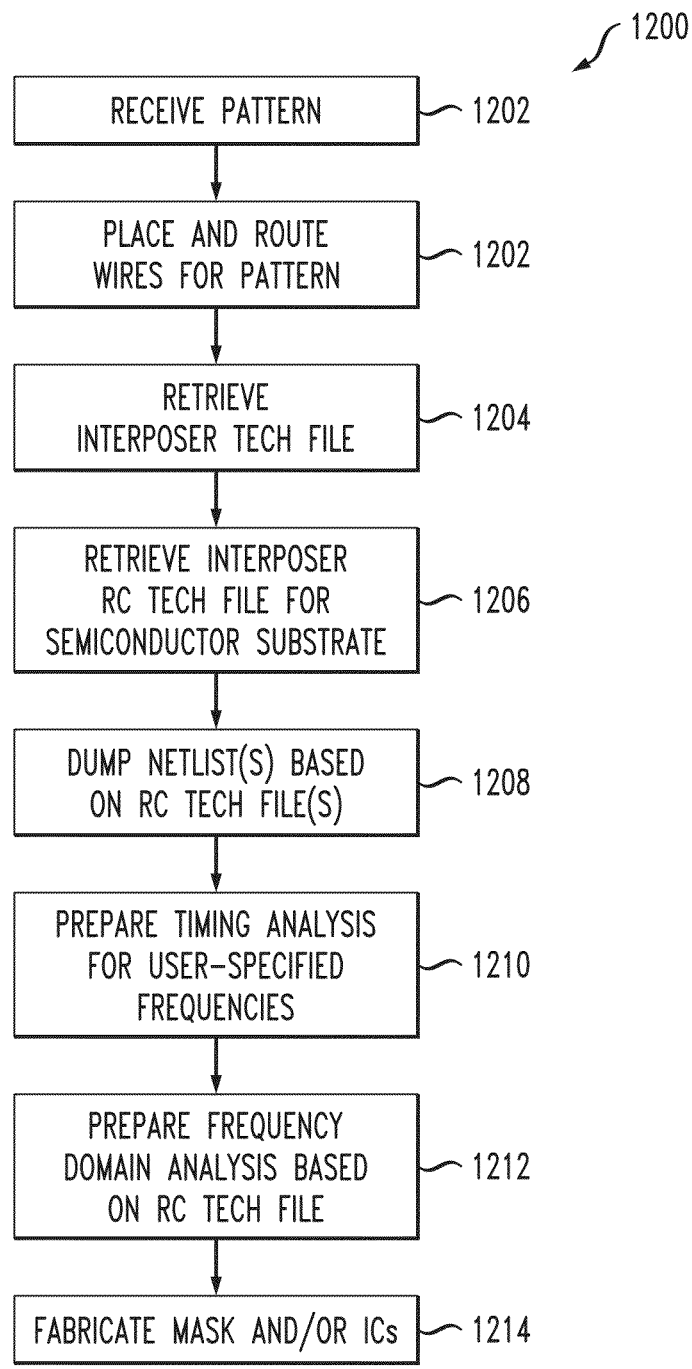
FIG. 12 is a flow diagram of one example of a method of simulating a semiconductor substrate based on an improved technology file.

At block 210, the RC tech files 312 may be stored in a non-volatile computer readable storage medium such as a read only memory ("ROM"), a random access memory ("RAM"), flash memory, or the like. The stored RC tech file may be used by system 300 in a method of simulating and fabricating an interposer 108. For example, FIG. 12 is a flow diagram of one example of a method 1200 for simulating and fabricating an interposer 108.

At block 1202, an interposer design is received at system 300. The place and route tool 304 performs placement, which determines the location of each element of the IC containing the patterns of the interposer 108. After placement, the routing step adds wires needed to properly connect the placed components while obeying all design rules for the IC. This placement and routing may be performed by a "fabless" designer, for example.

System 300 may retrieve a tech data file 324 from computer readable storage medium 306 at block 1206 for performing RC extraction. RC extraction includes checking to ensure that the layout meets the design requirements before converting the design files into pattern generator files. For example, analysis is performed to obtain capacitance and resistance for specific geometric descriptions of conductors in the design to create an estimation of the capacitance and resistance from a process which is called parasitic RC extraction. RC extraction tool 310 has software and hardware that translates a geometric description of conductor and insulator objects, or other shapes described in a candidate IC design file or database, to associated parasitic capacitance values.

In order to perform RC extraction, the RC tech files 324, 326 are respectively retrieved from a non-transient machine readable storage medium 306 at blocks 1204 and 1206. As described above, RC tech file 326 may include parameters for RC sensitivities for the couplings through the semiconductor substrate of interposer 108.

At block 1208, one or more netlists are created for the interposer 108 or other device. The netlists include values of R, C, and sensitivities and are used to prepare timing analysis for user-specified frequencies at block 1210 and frequency domain analysis at block 1212. As will be understood by one skilled in the art, blocks 1210 and 1212 may be simultaneously performed, block 1210 may be performed before block 1212, or block 1212 may be performed before block 1210. The timing and frequency domain analyses are used to evaluate whether the interposer 108 or other circuit meets timing specifications. If the specifications are not met, then EDA tool 300 repeats the place and route step, RC extraction, and timing and frequency analyses one or more times, until the timing analysis of the interposer 108 or other circuit meets specifications.

When all functional and timing requirements are satisfied by the design, the design is complete, and may be turned over for final sign-off check. The design is then provided to an IC foundry to fabricate a mask and the ICs at block 1214.

In some embodiments, a method includes approximating a physical characteristic of a semiconductor substrate identified by the electromagnetic simulation with a frequency-dependent circuit, and creating a technology file for the semiconductor substrate based on the frequency-dependent circuit. The technology file is adapted for use by an electronic design automation tool to create a netlist for the semiconductor substrate and is stored in a non-transient computer readable storage medium.

In some embodiments, a system includes a non-transient machine readable storage medium storing at least one technology file generated by an electronic design automation ("EDA") tool and an RC extraction tool within the EDA tool. The technology file is based on a frequency-dependent circuit that approximates at least one physical characteristic of a semiconductor substrate in response to an electromagnetic wave. The RC extraction tool is configured to generate a netlist based on the technology files and perform at least one of a timing analysis or a frequency domain analysis of the semiconductor substrate based on the netlist.

In some embodiments, a method includes generating a netlist for a semiconductor substrate based on a technology file stored in a non-transient computer readable storage medium, performing at least one of a timing analysis or a frequency domain analysis of the semiconductor substrate based on the netlist, and storing a result of the timing analysis or the frequency domain analysis in a non-transient computer readable storage medium. The technology file approximates at least one physical characteristic of the semiconductor substrate based on a frequency-dependent circuit model.

The disclosed systems and methods advantageously create tech files and netlists that account for electrical coupling between front-side and back-side conductors of a floating semiconductor substrate. The tech files and netlists may advantageously be created such that they may be implemented in an existing EDA tools without requiring significant overhaul to these existing systems. Additionally, the methodology described herein may be applied to develop tech files and netlists that account for thermal stress, power, or other changes in complex physical behaviors.

The methods described herein may be at least partially embodied in the form of computer-implemented processes and apparatus for practicing those processes. The disclosed methods may also be at least partially embodied in the form of computer program code embodied in tangible, non-transient machine readable storage media, such as RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of computer program code, whether loaded into and/or executed by a computer, such that, when the computer program code is loaded into and executed by a computer, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the system and method have been described in terms of exemplary embodiments, they are not limited thereto. Rather, the appended claims should be construed broadly, to include other variants and embodiments of the disclosed system and method, which may be made by those skilled in the art without departing from the scope and range of equivalents of the system and method.

What is claimed is:

1. A method, comprising:
   approximating a physical characteristic of a semiconductor substrate with a frequency-dependent circuit, the physical characteristic of the semiconductor substrate is identified by one of an electromagnetic simulation or a silicon measurement performed, at least in part, using a processor; and creating a technology file for the semiconductor substrate based on the frequency-dependent circuit, the technology file adapted for use by an electronic design automation tool to create a netlist for the semiconductor substrate.

2. The method of claim 1, wherein the frequency-dependent circuit includes at least one of a capacitor and a resistor.

3. The method of claim 1, wherein the physical characteristic of the semiconductor substrate includes at least one of an s-parameter or a y-parameter.

4. The method of claim 1, wherein the approximating the physical characteristic includes:
selecting a first point on a capacitance versus frequency graph having at least one curve,
approximating a slope of a first portion of the at least one curve with a first line,
approximating a slope of a second portion of the at least one curve with a second line, and
using equations of the first and second lines to approximate the physical characteristic.

5. The method of claim 1, wherein the approximating the physical characteristic includes:
receiving a user selection of a first resistance value,
receiving an equation for a frequency dependence of the frequency-dependent circuit, and
identifying values for the equation using a mathematical approximation based on data from the electromagnetic simulation or the silicon measurement of the semiconductor substrate and the first resistance value.

6. The method of claim 1, further comprising:
generating a netlist based on the technology file, and
performing at least one of a timing analysis or a frequency domain analysis of the semiconductor substrate based on the netlist.

7. The method of claim 6, further comprising fabricating the semiconductor substrate if the at least one of the timing analysis or the frequency domain analysis is completed.

8. The method of claim 1, wherein the semiconductor substrate is a floating semiconductor substrate of an interposer.

9. The method of claim 8, wherein the interposer includes at least one of conductors disposed in a front-side interconnect structure, conductors in a back-side interconnect structure, and through-silicon vias.

10. A system, comprising:
a non-transient machine readable storage medium storing at least one technology file generated by an electronic design automation ("EDA") tool, the at least one technology file based on a frequency-dependent circuit that approximates at least one physical characteristic of a semiconductor substrate in response to an electromagnetic wave; and
an RC extraction tool within the EDA tool configured to:
generate a netlist based on the at least one technology file, and
perform at least one of a timing analysis or a frequency domain analysis of the semiconductor substrate based on the netlist.

11. The system of claim 10, wherein the EDA tool is configured to perform at least one of an electromagnetic simulation or a silicon measurement of the semiconductor substrate, and
produce at least one graphical representation of an s-parameter or a y-parameter based on the electromagnetic simulation or the silicon measurement.

12. The system of claim 11, wherein the EDA tool is configured to generate a graphical representation of capacitance versus frequency and a graphical representation of resistance versus frequency of the semiconductor substrate.

13. The system of claim 10, wherein the frequency-dependent circuit includes a resistor and a capacitor.

14. The system of claim 10, wherein the frequency-dependent circuit includes a resistor, a capacitor, and an inductor.

15. A method, comprising:
generating a netlist for a semiconductor substrate based on a technology file stored in a non-transient computer readable storage medium, the technology file approximating at least one physical characteristic of the semiconductor substrate based on a frequency-dependent circuit model; and
performing at least one of a timing analysis or a frequency domain analysis of the semiconductor substrate based on the netlist using, at least in part, a processor.

16. The method of claim 15, further comprising:
approximating the physical characteristic of the semiconductor substrate with a frequency-dependent circuit, the physical characteristic identified by one of an electromagnetic simulation or a silicon measurement;
creating the technology file for the semiconductor substrate based on a model of the frequency-dependent circuit; and
storing the technology file in the non-transient computer readable storage medium.

17. The method of claim 16, wherein the frequency-dependent circuit includes at least one of a capacitor and a resistor.

18. The method of claim 16, wherein approximating the physical characteristic includes:
receiving a user selection of a first capacitance value,
receiving an equation for a frequency dependence of the frequency-dependent circuit, and
identifying values for the equation using a mathematical approximation based on data from the electromagnetic simulation or the silicon measurement of the semiconductor substrate and the first capacitance value.

19. The method of claim 16, wherein the approximating the physical characteristic includes:
selecting a first point on a resistance versus frequency graph having at least one curve,
approximating a slope of a first portion of the at least one curve with a first line,
approximating a slope of a second portion of the at least one curve with a second line, and
using equations of the first line and the second line to approximate the physical characteristic.

20. The method of claim 15, wherein the physical characteristic of the semiconductor substrate includes at least one of an s-parameter or a y-parameter.

* * * * *